United States Patent Office 3,065,070
Patented Nov. 20, 1962

3,065,070
METHOD FOR THE MANUFACTURE OF TOUGH CAST IRON
Kokichi Otani, 64 Hanezawa-cho, Shibuya-ku, Tokyo-to, Japan
No Drawing. Filed Feb. 15, 1960, Ser. No. 8,714
5 Claims. (Cl. 75—130)

This invention relates to a method for manufacturing tough cast iron characterized by combining molten iron in a furnace or molten iron taken from a furnace with a rare earth ore and then inoculating the mixture by blending a specific amount of inoculant such as Ca-Si, $CaF_2$ and Al so as to provide a strong deoxidizing atmosphere to thereby form tough nodular graphite cast iron.

By the term "furnace" used herein is meant a furnace which produces molten iron, namely electric furnace, reverberatory furnace, melting furnace and blast furnace, and any one of these furnaces may be used for carrying out the method according to this invention. By "rare earth ore" is meant monazite and bastnasite. All of these materials consist of the same ingredients with only the exception that there is a difference in the contents of rare earth elements. Monazite is abundantly available quantitatively as well as being cheap. By "strong deoxidizing atmosphere" is meant an atmosphere which would be suitable for expelling oxides present in the molten iron and which is formed by the action of inoculants such as calcium silicide (Ca-Si), fluorite ($CaF_2$) and aluminum (Al). By "blending a specific amount of inoculant" is meant blending a mixed powder or tablets consisting of a specific blend of inoculants.

In describing the method according to this invention, I shall first explain the prior known methods and compare them with this method. As known methods there are the following:

(a) Method which employs Mg or Mg alloy as inoculant, (b) Method which employs Ce and an alloy of the Ce group as inoculant, (c) Method which employs a combination of Ce and an alloy of the Ce group and Mg or Mg alloy as inoculant, (d) Method which employes a high grade alloy of rare earth elements refined from rare earth ores as inoculant.

According to the present invention which differs from these known methods, the rare earth ores are not refined but are used as they are in a specific amount.

Rare earth ores contain oxides which acidify molten iron, and in order to make them neutral or alkaline, they are subjected to the action of a specified amount of a deoxidizing agent to effectively form tough nodular graphite cast iron. That is, the rare earth ores are used as they are without being refined, and for the entailing deoxidation of the oxides contained in them they are inoculated and reacted with a substantially effective amount of a deoxidizing inoculant. The products obtained according to this method have a wide range of hardness between Shore ($H_s$) 100–30, and as to strength, although there is a difference depending on hardness, they have a strength of 35 kg./mm.$^2$–110 kg./mm.$^2$ or two to eight times stronger than conventional cast iron. Furthermore, a distinctive feature of the cast iron produced by this method is that it possesses an extremely stable hardness that will not deteriorate even when the cast iron is annealed.

According to the present invention, a specific amount of cast iron is inoculated under a strong deoxidizing atmosphere. Any excess or deficiency of this specific or basic amount will change the cast iron obtained. Thus, to maintain this basic amount is a requirement for manufacturing tough nodular graphite cast iron. The basic inoculants to be added are Ca-Si, $CaF_2$, Al and monazite. Of these materials a part of Ca-Si may be substituted by Fe-Si and a part of $CaF_2$ by CaO. Monazite may be entirely substituted by cerium chloride or bastnasite. These substitutions will in no way effect the deoxidation or the graphite nodulation.

Ca-Si consists of Si 60%, Ca 30% and Fe 8%. The more Ca it contains the better it is, but those calcium silicites having a Ca content above this are difficult to use as they will weather. Monazite (or cerium chloride or bastnasite) is a representative rare earth ore but contains oxygen and other materials of strong acidity such as $SiO_2$ and the like in the form of oxides.

It is essential to separate oxygen and such oxides as $SiO_2$ as basic slag, and for this purpose a specific amount of a deoxidizing agent is required.

If this rare earth ore should be substituted partly or wholly by a refined rare earth of high grade, a small amount of deoxidizing agent will do. On the one hand the cost of such rare earth is high which reduces its economic value, but it can be employed for the manufacture of tough nodular graphite cast iron.

Monazite is produced the most among the rare earth ores. It contains 45–60% rare earth oxides. Bastnasite contains 65–70% of rare earth oxides.

An example of monazite is given below.

*Example of Malaya Monazite*

| | Percent |
|---|---|
| $CeO_2$ | 22.5 |
| $La_2O_3$ | 14.5 |
| $Nd_2O_3$ | 9.7 |
| $Pr_2O_3$ | 2.7 |
| Residual rare earth oxides | 4.47 |
| Rare earth oxides | 53.87 |
| $ThO_2$ | 7.15 |
| $SiO_2$ | Balance |

An example of bastnasite produced in Congo, Africa, has the following analysis:

| | Percent |
|---|---|
| $CeO_2$ | 33.4 |
| $La_2O_3$ | 21.75 |
| $Nd_2O_3$ | 11.07 |
| Residual rare earth oxides | 0.95 |
| Rare earth oxides | 67.17 |
| $ThO_2$ | Trace |
| $SiO_2$ | 4.34 |
| $P_2O_5$ | 9.80 |
| $Fe_2O_3$ | 2.00 |
| F | 3.12 |
| Ignition loss | 13.20 |
| | 99.63 |

The higher the grade of rare earth oxides the less the amount of deoxidizing agent required, and vice versa the lower the grade of rare earth oxides the more the amount of deoxidizing agent required.

The cost of monazite is determined by the contents of these rare earth oxides, and those containing approximately 60% rare earth oxides cost about $0.20–$0.28. Bastnasite of 50–60% grade is $0.76–$0.81 per kg.

In case of refined misch metal, the cost is $8.40 per kg. which is 15 times higher than monazite in terms of purity. The cost of cerium oxide and cerium fluoride is $1.96–$2.80 per kg. which is 10 times higher than that of monazite.

To use monazite as an inoculant is suitable from the economic standpoint, and is one of the major advantages of the present invention.

I shall next explain the standard amount required for producing nodular graphite.

To 100 parts of molten iron the inoculating amount of inoculants to be added is Ca-Si 2.5, Al 0.32, $CaF_2$ 0.32 and monazite 0.32–0.64 parts $$(CaSi + Al + CaF_2 + Monazite = 3.46-3.78)$$

The molten iron may be taken from an electric furnace, melting furnace or reverberatory furnace but it is preferable that the sulphur and phosphorus contents be under 0.020% and under 0.1%, respectively. If the contents of sulphur and phosphorus should be higher than specified, it will be necessary to remove them from the furnace. As means of their removal argon and nitrogen gas are fed into the furnace or the removal may be effected by charging calcium carbide, calcium oxide (CaO) and the like within the limits.

As to the inoculating amount of the inoculants to be added, a good compounding ratio is $$Ca\text{-}Si:Al:CaF_2:Monazite = 2.5:0.32:0.32:0.32-0.64$$
$$= 10:1.28:1.28:1.28-2.56$$

It is more convenient to use the inoculants in the form of tablets prepared within this compounding ratio.

When the sulphur and phosphorus contents in the molten iron are within the specified limits, the amount of the inoculants to be added would be as described above, namely molten iron:tablets = 100:3.46–3.78, but if the said contents should depart from the specified limits, the object can then be accomplished by increasing the above amount of tablets. If the sulphur and phosphorus contents should be 0.030 and 0.20, respectively, it cannot absolutely be said so but 3.78–3.46×2 would be practicable.

If sulphur and phosphorus are contained within the limits described above, it would be economical since a less amount of inoculants to be added would be required.

The following are examples of this invention.

(In the following examples the symbol Hv is an abbreviated symbol of Vickers' hardness number, and Hs represents an abbreviated symbol of Shore's sclerscope hardness number.)

EXAMPLE 1

Furnace used: Electric furnace.
Pig iron used:
   High purity pig iron: 10 kg. (C, 3.59; Si, 0.35; Mn, 0.05; S, 0.015; P, 0.022).
   Coke pig iron: 10 kg. (C, 4.3; Si, 1.19; Mn, 0.15; P, 0.090; S, 0.024).
   Ferronickel: 2.2 Kg. (C, 3.3; Si, 0.85; Ni, 22; Cr, 1.19).
Melt-down: Me-Mn—100 g.; Fe-Cr—260 g.
Tapping temperature: 1560° C.
Casting temperature: 1400° C.

Inoculation:

Charged into the molten metal in the furnace: CaSi, grams.

Laid at the bottom of the pan:

| | Grams |
|---|---|
| Ca-Si | 300 |
| Al | 70 |
| $CaF_2$ | 70 |
| Monazite | 140 |

Chemical analysis of the product obtained:

| C | Si | Mn | P | S | Ni | Cr |
|---|---|---|---|---|---|---|
| 3.78 | 2.02 | 0.47 | 0.095 | 0.018 | 2.10 | 0.70 |

Having Shore's sclerscope hardness number 60 and Vickers' hardness number (by 30 kg. load) 434, this product is suitable for roll material.

EXAMPLE 2

Furnace used: Electric furnace.
Pig iron used:
   High purity pig iron: 11 kg. (C, 3.40; Si, 0.37; Mn, 0.08; P, 0.021; S, 0.017).
   Coke pig iron: 11 kg. (C, 4.3; Si, 1.20; Mn, 0.16; P, 0.085; S, 0.025).
Melt-down: Fe-Mn—100 g.
Tapping temperature: 1510° C.
Casting temperature: 1400° C.
Inoculation (total 640 g. were mixed and formed into tablets and inoculated in the ladle):

| | Grams |
|---|---|
| Ca-Si | 360 |
| $CaF_2$ | 70 |
| Al | 70 |
| Monazite | 140 |

This product has a Shore's sclerscope hardness number 35 and it is most suitable as cast iron for ingot moulds.

Chemical analysis of the product:

| C | Si | Mn | P | S | Ni | Cr |
|---|---|---|---|---|---|---|
| 3.78 | 1.40 | 0.45 | 0.095 | 0.018 | ---- | ---- |

EXAMPLE 3

Furnace used: Electric furnace.
Pig iron used:

| | | |
|---|---|---|
| High purity pig iron | kg | 7.2 |
| Ferronickel | kg | 2.5 |
| Fe-Cr | g | 245 |

Melt-down: Fe-Mn—80 g.; Fe-Mo—50 g.
Tapping temperature: 1530° C.
Casting temperature: 1450° C.
Inoculation (blown in with nitrogen):

| | Grams |
|---|---|
| Ca-Si | 250 |
| $CaF_2$ | 30 |
| Al | 30 |
| Monazite | 60 |

Chemical analysis:

| C | Si | Mn | P | S | Ni | Cr | Mo |
|---|---|---|---|---|---|---|---|
| 3.56 | 1.53 | 0.47 | 0.095 | 0.013 | 5.35 | 1.92 | 0.32 |

Vickers' hardness number (30), 700. Shore's sclerscope hardness number (conversion value), 81. Shore's sclerscope hardness number (actual value), 82.

EXAMPLE 4

Furnace used: Electric furnace.
Pig iron used:

| | | |
|---|---|---|
| Iwate charcoal pig | kg | 8.8 |
| Ferronickel | kg | 1.0 |
| Fe-Cr | g | 80 |
| Fe-Mn | g | 40 |
| Fe-Mo | g | 50 |

Tapping temperature: 1510° C.
Casting temperature: 1450° C.
Inoculation:

| | Grams |
|---|---|
| Ca-Si | 250 |
| CaF | 30 |
| Al | 30 |
| Monazite | 60 |

Chemical analysis:

| C | Si | Mn | P | S | Ni | Cr | Mo |
|---|---|---|---|---|---|---|---|
| 3.40 | 1.96 | 0.58 | 0.057 | 0.018 | 2.13 | 0.48 | 0.28 |

This product has a Shore's scleroscope hardness number 40.

EXAMPLE 5

Furnace used: Reverberatory furnace.

| Material used | Percent | Weight, kg. | C | Si | Mn | P | S | Ni | Cr | Mo |
|---|---|---|---|---|---|---|---|---|---|---|
| Feeder head | 14.3 | 2,000 | 3.17<br>0.45 | 1.96<br>0.05 | 0.35<br>0.05 | 0.064<br>0.009 | 0.021<br>0.003 | 3.30<br>0.47 | 1.18<br>0.17 | 0.29<br>0.04 |
| Fe-Ni 75 | 3.7 | 512 | 3.3<br>0.12 | 0.61<br>0.02 | | | | 23.5<br>0.86 | 0.18 | |
| Fe-Ni 76 | 3.6 | 500 | 3.21<br>0.11 | 0.37<br>0.01 | | | | 22.8<br>0.81 | 2.82<br>0.10 | |
| Fe-Ni 71 | 3.9 | 413 | 3.10<br>0.09 | 0.60<br>0.02 | | | | 22.0<br>0.65 | | |
| Molten metal remaining from a previous test. | 10.7 | 1,500 | 3.3<br>0.35 | 2.0<br>0.21 | 0.55<br>0.06 | 0.070<br>0.007 | 0.020<br>0.002 | 2.0<br>0.21 | 0.60<br>0.06 | 0.30<br>0.03 |
| High purity pig iron | 65.0 | 9,100 | 3.84<br>2.50 | 0.15<br>0.10 | 0.04<br>0.03 | 0.010<br>0.006 | 0.015<br>0.010 | | | |
| Fe-Cr | | 156 | | | | | | | 60<br>0.67 | |
| Fe-Mo | | 54 | | | | | | | | 60<br>0.23 |
| | | 14,025 | 3.62 | 0.64 | 0.14 | 0.022 | 0.015 | 3.00 | 1.00 | 0.30 |

Melt-down:

Fe-Mn _____kg__ 170
Fe-Mn _____kg__ 30
Fe-Si _____kg__ 20
Fe-Si _____kg__ 15

Tapping temperature: 1480° C.
Casting temperature: 1360° C.
Inoculation:
   Inoculated in the furnace: Ca-Si, 222 kg.
   Inoculated in the pan:

Kg.
Ca-Si _____ 222
Al _____ 47
CaF₂ _____ 47
Monazite _____ 96

Chemical analysis of the product:

| C | Si | Mn | P | S | Ni | Cr | Mo |
|---|---|---|---|---|---|---|---|
| 2.79 | 2.10 | 0.76 | 0.062 | 0.011 | 3.06 | 0.85 | 0.29 |

EXAMPLE 6

Furnace used: Electric furnace
Pig iron used (same as before):                 Kg.
   High purity pig iron _____ 10
   Coke pig iron _____ 10
   Ferronickel _____ 2.2
Melt-down: Fe-Mn—100 g.; Fe-Cr—260 g.
Tapping temperature: 1510° C.
Casting temperature: 1380° C.
Inoculation (inoculated in the pan):           Grams
   Ca-Si _____ 500
   CaF₂ _____ 140
   Al _____ 140
   Monazite _____ 280

The product obtained is of good quality having high ferrite content and being tough.

Chemical analysis:

| C | Si | Mn | P | S | Ni | Cr |
|---|---|---|---|---|---|---|
| 3.46 | 1.87 | 0.48 | 0.104 | 0.016 | 2.26 | 0.61 |

EXAMPLE 7

Furnace used: Electric furnace
Pig iron used (same as before):                 Kg.
   High purity pig iron _____ 10
   Coke pig iron _____ 10
   Ferronickel _____ 2.2
Melt-down: Fe-Mn—100 g.; Fe-Cr—260 g.
Tapping temperature: 1530° C.
Casting temperature: 1400° C.
Inoculation (inoculated in the pan):           Grams
   Ca-Si _____ 500
   CaF₂ _____ 200
   Al _____ 200
   Monazite _____ 400

Chemical analysis:

| C | Si | Mn | P | S | Ni | Cr |
|---|---|---|---|---|---|---|
| 3.63 | 1.91 | 0.46 | 0.120 | 0.016 | 1.86 | 0.74 |

Especially fine nodular graphite cast iron was obtained.

EXAMPLE 8

Furnace used: Electric furnace
Pig iron used:                                 Kg.
   High purity pig iron _____ 10
   Coke pig iron _____ 10
   Ferronickel _____ 2.2
Inoculation (inoculated in the pan):           Grams
   Ca-Si _____ 150
   CaF₂ _____ 35
   Al _____ 35
   Monazite _____ 70

By maintaining the mixing proportion of the inoculants and inoculating a large quantity, good quality nodular graphite cast iron may be obtained. However, although the use of an excessive amount of inoculant will produce good quality products, not only will it not pay from the economical standpoint but also when a large quantity of inoculant is employed the temperature of the molten metal will drop and thereby produce adverse effects. By maintaining the mixing proportion of the inoculants and inoculating a small quantity, nodular graphite will convert to fine eutectic graphite cast iron having a high degree of toughness. Further, by inoculating a still less amount, the effect of the inoculant will diminish, but the resulting product whether in the form of eutectic crystals or flakes still exhibits the properties of tough graphite cast iron more than those products in the same form which have not used such inoculant. (The scope of this invention refers to a scope in which effects are obtained by inoculating the specific amount of inoculant.) Nodular graphite cast iron of good quality will be obtained if the proportions of Ca-Si, Al, $CaF_2$ and monazite to be added to a molten metal obtained by melting 22 kg. of pig iron in an experimental 30 kg. model Detroit type electric arc furnace are above the proportions given in the following table. The use of pig iron of high purity will require a small quantity of inoculant.

| Ca-Si, grams | 150 | 300 | 400 | 500 | 600 | 800 | 1,000 |
|---|---|---|---|---|---|---|---|
| Al, grams | 70 | 70 | 70 | 70 | 70 | 70 | 70 |
| $CaF_2$, grams | 70 | 70 | 70 | 70 | 70 | 70 | 70 |
| Monazite, grams | 140–70 | 140–70 | 140–70 | 140–70 | 140–70 | 140–70 | 140–70 |
| High purity pig iron, percent | 100 | 80 | 60 | 50 | 40 | 20 | 0 |
| Charcoal pig or coke pig iron, percent | 0 | 20 | 40 | 50 | 60 | 80 | 100 |

In case of proportions above those given in the above table, for example, when high purity pig iron is 100% and the amount of Ca-Si, Al, $CaF_2$, and monazite should be 600 g., 70 g., 70 g., and 140 g., respectively, nodulation will of course be easier. On the other hand, when coke pig iron is 100% and the amount of Ca-Si, Al, $CaF_2$, and monazite should be 600 g., 70 g., 70g., and 140 g., respectively, there would be a shortage of 400 g. of Ca-Si and therefore a satisfactory nodular graphite cast iron will not be obtained but a tough eutectic graphite cast iron will be obtained. Further, taking the proportion of pig iron as basis, that is, if 22 kg. of high purity pig iron and coke pig iron are melted in a 40%:60% ratio, a satisfactory nodular graphite will be obtained if the amount of Ca-Si, $CaF_2$, Al, and monazite are 600 g., 70 g., 70 g., and 140 g., respectively.

If the amount of Ca-Si should be varied, the respective amount of Al, $CaF_2$ and monazite should be increased or decreased accordingly. This relation is shown in the following table.

| Ca-Si, grams | 1,000 | 800 | 600 | 400 | 300 | 150 |
|---|---|---|---|---|---|---|
| $CaF_2$, grams | 17 | 35 | 70 | 100 | 140 | 200 |
| Al, grams | 17 | 35 | 70 | 100 | 140 | 200 |
| Monazite, grams | 35 | 70–35 | 140–70 | 200–100 | 280–140 | 400–200 |

These proportions were found through experiments. Since a highly refined pig iron (so-called high purity pig iron which has low sulphur and phosphorus contents) has been refined so as to reduce its sulphur and phosphorus contents, harmful elements such as oxides and hydrides have been expelled simultaneously and consequently to use such pig iron will require a less amount of deoxidizing agent. Accordingly, it means that the quantity of deoxidizing agent required will vary according to the purity of the pig iron.

I will next explain the mutual relation between the $CaF_2$, Al, and monazite. The monazite does not comprise refined rare earth elements but consists of rare earth oxides and other impurities such as $SiO_2$ combined together, and among the constituents those effective in the molten metal are the rare earth elements. The monazite will be placed in a state where it will be refined simultaneously in the molten metal. What removes the oxides is the aluminum, and in case of a large amount of monazite, it is necessary to increase the amount of aluminum. When high purity cerium fluoride or cerium oxide misch metal is used in place of monazite, a small amount of $CaF_2$ and Al will suffice but this would not pay from the economical standpoint. Examples are given as follows:

EXAMPLE 9

Furnace used: electric furnace
Pig iron used: Kg.
    High purity pig iron _____ 21
    Ferronickel _____ 2.3

Melt-down: Fe-Mn—60 g.
Tapping temperature: 1570° C.
Casting temperature: 1460° C.
Inoculation:
    (Inoculated in the molten metal in the furnace: Ca-Si—350)
    Charged into the pan: Grams
        Ca-Si _____ 350
        Fe-Si _____ 100
        $CaF_2$ _____ 50
        Al _____ 18
        Ce _____ 10

EXAMPLE 10

Furnace used: electric furnace
Pig iron used: Kg.
    High purity pig iron _____ 20
    Ferronickel _____ 2.1

Tapping temperature: 1580° C.
Casting temperature: 1500° C.
Inoculation:
    (Inoculated in the furnace: Ca-Si—300)
    Charged into the pan: Grams
        Ca-Si _____ 300
        Fe-Si _____ 100
        $CaF_2$ _____ 50
        Al _____ 18
        Ce _____ 5

To increase the amount of $CaF_2$ imparts fluidity to the slag and is effective in making the residues which have accomplished the deoxidation, namely $Al_2O_3$ or $SiO_2$, to float and be expelled.

The use of a large amount of Al will be attended by an exothermic reaction and consequently prevent the temperature of the molten metal from dropping (flow temperature is an unfavorable condition).

What I claim is:
1. A method of manufacturing nodular graphite cast iron comprising the steps of melting about 100 parts by weight of an iron composition having a sulphur content of under 0.020% and a phosphorous content of under 0.10%, combining with said molten iron about 0.32 to about 0.64 part of a rare earth ore containing about 45 to 70% rare earth oxides, about 2.5 parts calcium silicide, about 0.32 part aluminum, and about 0.32 part fluorite.

2. A method as claimed in claim 1 including the prior steps of melting an iron composition containing more than the desired amount of sulphur and phosphorous, removing from said molten iron in the furnace the excess sulphur and phosphorous content to yield an iron composition having a sulphur content of under 0.020% and a phosphorous content of under 0.10%.

3. A method as claimed in claim 1, said additives being at least partially in tablet form containing all four ingredients.

4. A method as claimed in claim 1, said rare earth ore being bastnasite.

5. A method as claimed in claim 1, said rare earth ore being monazite.

References Cited in the file of this patent

UNITED STATES PATENTS

| | | |
|---|---|---|
| 2,821,473 | Moore | Jan. 28, 1958 |
| 2,963,364 | Crockett et al. | Dec. 6, 1960 |
| 2,980,530 | Crome | Apr. 18, 1961 |